United States Patent [19]

Taylor

[11] 4,009,092
[45] Feb. 22, 1977

[54] SUBSTITUTED LITHIUM PHOSPHATES AND SOLID ELECTROLYTES THEREFROM

[75] Inventor: Barry Edward Taylor, Claymont, Del.

[73] Assignee: E. I. Du Pont de Nemours and Company, Wilmington, Del.

[22] Filed: Feb. 27, 1976

[21] Appl. No.: 662,003

[52] U.S. Cl. .............................. 204/242; 204/1 T; 252/62.2; 423/306; 429/104; 429/193

[51] Int. Cl.$^2$ ...................... C25B 9/00; H01M 6/04

[58] Field of Search ............. 136/6 FS, 83 R, 153; 423/306; 252/62.2; 204/1 S, 195 S, 242

[56] References Cited

UNITED STATES PATENTS

| | | | |
|---|---|---|---|
| 3,736,186 | 5/1973 | Liang | 136/153 |
| 3,824,130 | 7/1974 | Liang | 136/153 |
| 3,911,085 | 10/1975 | Bither et al. | 136/153 |

Primary Examiner—Donald L. Walton

[57] ABSTRACT

Lithium phosphates are provided which have the formula:

$$Li_{1-2x-y+z}Mg_xM_{2-y}{}^{4+}M_y{}^{5+}(P_{1-z/3}Si_{z/3}O_4)_3 \cdot q(Li_2O)$$

wherein
 $M^{4+}$ is at least one of zirconium and hafnium;
 $M^{5+}$ is at least one of niobium and tantalum;
 $x$ is 0 to about 0.15;
 $y$ is 0 to about 0.5;
 $z$ is 0 to about 0.3;
 $q$ is 0 to about 0.2; and
 $2x+y-z$ is at least −0.1.

These substituted lithium phosphates are useful as solid electrolytes in electrochemical cells such as galvanic cells and electrolytic cells.

16 Claims, 3 Drawing Figures

SUBSTITUTED LITHIUM PHOSPHATES AND SOLID ELECTROLYTES THEREFROM

BACKGROUND OF THE INVENTION

1. Field of the Invention

This invention relates to substituted lithium phosphates and more particularly to lithium salts of zirconium and hafnium phosphates and to their use as solid electrolytes in electrochemical cells.

2. Description of the Prior Art

Solid ionic conductors are desirable for use as solid electrolytes.

Li has long been regarded as a desirable component of galvanic cells. It is inexpensive and its high reduction potential ($E°_{red} = -3.024v$) and light weight have often suggested its use as the anodic component in high energy-density storage batteries. (See, for example, S. Pizzini, J. Appl. Electrochem 1, 153 (1974)). The reactivity of Li with water has required the use of non-aqueous electrolytes such as organic soluble lithium perchlorates, or fused lithium halides. $Li^+$ conductors which are solid and are more highly conductive at lower temperatures than previously used electrolytes would be quite useful in such utilities; these conductors also serve to separate the anodic and cathodic components.

Solid electrolytes and in particular completely solid state galvanic cells offer special advantages as low-energy density, low-power density primary batteries. These advantages include the possibility for long shelf life, broad temperature limits of operability and miniaturization. A $Li^+$ conducting solid electrolyte would provide the basis for a lighter and lower cost alternative to the solid state batteries which rely on the transport of $Ag^+$ in various silver halides.

The known $Li^+$ conductors with the highest conductivities are LiI mixed with $CaI_2$ (C. R. Schlaiker and C. C. Liang, Proc. NATO Adv. Study Inst. of Fast Ion Transport, Sept. 5, 1972); single crystals of lithium β-alumina $LiAl_{11}O_{17}$ (M. S. Whittingham and R. A. Huggins, NBS spec. Pub. 364, Solid State Chemistry, 139 (1972) and single crystals of certain of the Cl-Br lithium haloboracites (Bither and Jeitschko, U.S. Pat. No. 3,911,085). All have conductivities at 200° C of the order of $10^{-3}$ $(\Omega - cm)^{-1}$.

Two recently issued Japenese patents discuss the phases $Li_2SO_4 \cdot LiOH \cdot LiI$ and $Li_2SO_4 \cdot LiOH$ with conductivities of $5 \times 10^{-2}$ $(\Omega\ cm)^{-1}$ and $1.5 \times 10^{-2}$ $(\Omega\ cm)^{-1}$, respectively at 200° C (Japanese Kokai: 49–81899 and 49–81898, issued Aug. 7, 1974). However, these phases appear to melt below 200° C and therefore are not useful as solid electrolytes at a temperature of 200° C or above.

The preparation of the phosphates $M^I M_2^{IV}(PO_4)_3$ where $M^I$ = Li,Na,K,Rb,Cs and $M^{IV}$ = Zr, Hf is described by M. Sljukic, B. Matkovic, B. Prodic and S. Scavnicar, Croat. Chim. Acta. Zagreb, 39, 145–8, (1967). Lattice constants were obtained from oscillation and Weissenberg X-ray diffraction photographs. The X-ray data suggest that all these compounds are isostructural with space group R3C or R3̄C. These compounds were prepared by heating the reactants at a maximum temperature of 1200° C and then cooling at a slow rate. L. Hagman and P. Kierkegaard, Acta. Chem. Scand. 22, 1822 (1968), report the results of a detailed crystal structure determination of $NaZr_2(PO_4)_3$. It was found to have the space group R3̄C. The structure consists of a three-dimensional framework of $PO_4$ tetrahedra and $ZrO_6$ octahedra which are linked by corners. The sodium ions have six fold coordination, although these octahedra are severely distorted.

No conductivity measurements have been reported in the above references for $LiHf_2(PO_4)_3$, $LiZr_2(PO_4)_3$, $NaHf_2(PO_4)_3$, $NaZr_2(PO_4)_3$ or any of the other known end member compositions $M^I M_2^{IV}(PO_4)_3$, where $M^I$ = Li, Na; $M^{IV}$ = Ti, Ge, Sn, Th, U.

SUMMARY OF THE INVENTION

According to the present invention, there is provided a lithium phosphate of the formula:

wherein
$M^{4+}$ is at least one of zirconium and hafnium;
$M^{5+}$ is at least one of niobium and tantalum;
$x$ is 0 to about 0.15;
$y$ is 0 to about 0.5;
$z$ is 0 to about 0.3;
$q$ is 0 to about 0.2;
$2x+y-z$ is at least $-0.1$ and at least one of x, y and z is not equal to zero.

There is also provided an electrochemical device having (a) two electrodes, one of which is lithium, LiAl or LiHg amalgam; (b) a solid electrolyte separating the two electrodes; and (c) connecting electrical conductor to complete an electrical circuit between the two electrodes, wherein the solid electrolyte consists essentially of a lithium phosphate of the formula:

wherein
$M^{4+}$ is at least one of zirconium and hafnium;
$M^{5+}$ is at least one of niobium and tantalum;
$x$ to 0 to about 0.15;
$y$ is 0 to about 0.5;
$z$ is 0 to about 0.3;
$q$ is 0 to about 0.2; and
$2x+y-z$ is at least $-0.1$.

DETAILED DESCRIPTION OF THE INVENTION

The lithium salts of zirconium and hafnium phosphates used in the electrochemical cells of this invention are crystalline solids in which ionic conductivity has been found to occur. It has been discovered that the lithium ions in these phosphates are quite mobile and permit substantial ionic conductivity, especially at slightly elevated temperatures.

The compositions in which this ionic conductivity has been found have a distorted rhombohedral or rhombohedral crystal structure with the space group R3̄C and the formula $LiM_2^{4+}(PO_4)_3$ where $M^{4+}$ = Zr, Hf. Substituted lithium phosphates having this ionic conductivity have the general formula:

$$Li_{1-2x-y+z}Mg_xM_{2-y}^{4+}M_y^{5+}(P_{1-z/3}Si_{z/3}O_4)_3 \cdot 9(Li_2O)$$

wherein
$M^{4+}$ is Zr, Hf;
$M^{5+}$ is Nb, Ta;
$x$ is 0 to about 0.15;
$y$ is 0 to about 0.5;
$z$ to 0 to about 0.3;
$q$ is 0 to about 0.2; and
$2x+y-z$ is at least $-0.1$, preferably no greater than about 0.5, and at least one of $x$, $y$, and $z$ is not equal to 0.

Preferred substituted lithium phosphates have the formula:

$$Li_{1-2x-y}Mg_xM_{2-y}^{4+}M_y^{5+}(PO_4)_3$$

wherein
$M^{4+}$, $M^{5+}$, $x$ and $y$ are as defined above and $2x+y$ is greater than 0.05 and no greater than about 0.5.

Especially preferred substituted lithium phosphates have the formula:

$$Li_{1-y}M_{2-y}^{4+}M_y^{5+}(PO_4)$$

wherein
$M^{4+}$ and $M^{5+}$ are as defined above with Ta especially preferred for $M^{5+}$; and
$y$ is about 0.05–0.5; and
the formula:

$$Li_{1-2x}Mg_xM_2^{4+}(PO_4)_3$$

wherein
$M^{4+}$ is as defined above with Zr especially preferred, and
$x$ is about 0.05–0.15. Particularly preferred substituted lithium phosphates are $Li_{.8}Zr_{1.8}Ta_{.2}(PO_4)_3$, $Li_{.5}Hf_{1.5}Ta_{.5}(PO_4)_3$, and $Li_{.8}Mg_{.1}Zr_2-(PO_4)_3 \cdot LiHf_2\cdot(PO_4)_3$ is also preferred as a solid electrolyte in an electrochemical cell.

Figure 1:
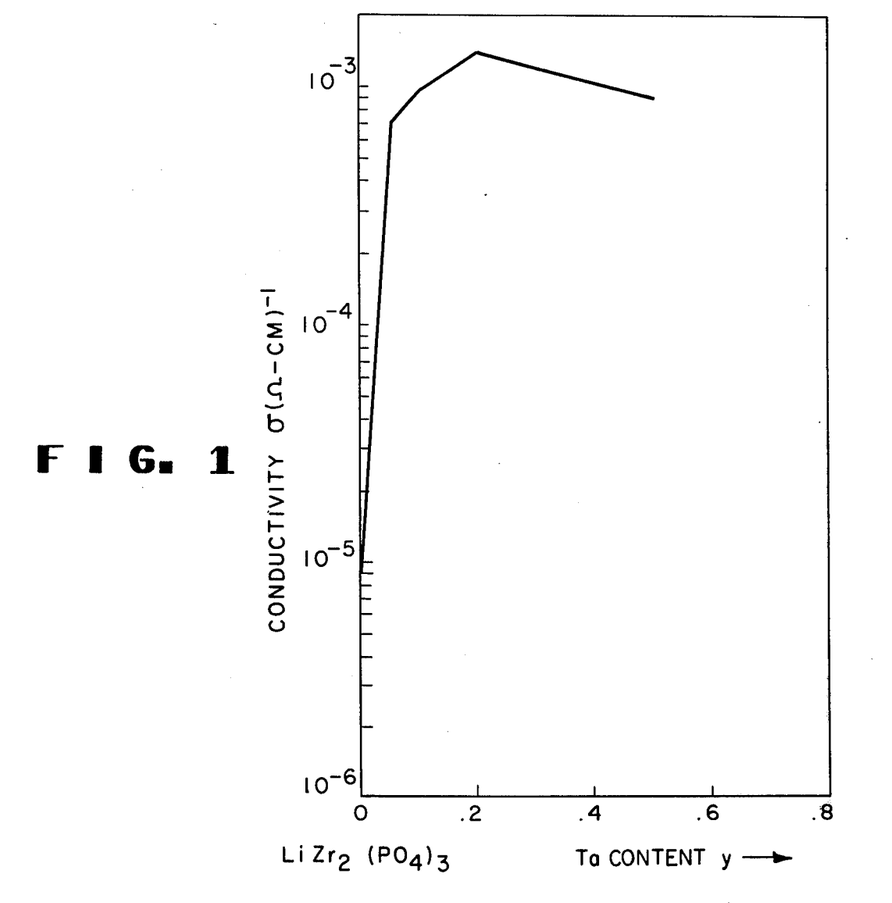
FIG. 1 is a graph showing the conductivity at 200° C as a function of Ta content in the substituted lithium phosphate $Li_{1-y}Zr_{2-y}Ta_y(PO_4)_3$.

The variation in ionic conductivity at 200° C among end member compositions is considerable. For example, the conductivity of $LiHf_2(PO_4)_3$ at 200° C is slightly greater than $10^{-3}$ $(\Omega cm)^{-1}$ while that of $LiZr_2(PO_4)_3$ is slightly less than $10^{-5}$ $(\Omega cm)^1$. Variations of ionic conduction with substitutions are also large and unpredictable. For example, the substitutions of even small amounts of Ta for Zr in the series $Li_{1-y}Zr_{2-y}Ta_y(PO_4)_3$ results in a substantial increase in the conductivity at 200° C as shown in FIG. 1, while a similar substitution in the series $Li_{1-y}Hf_{2-y}Ta_y(PO_4)_3$ results in a decrease in conductivity followed by an increase to nearly the conductivity of the unsubstituted composition when the value of y approaches 0.5.

Values of conductivity of $5-10 \times 10^{-4}$ $(\Omega cm)^{-1}$ at 200° C have been observed for $LiHf_2(PO_4)_3$ and for the substituted compositions $Li_{1-y}Zr_{2-y}Ta_y(PO_4)_3$ where y is from about .05 to about 0.5, $Li_{1-y}Hf_{2-y}Ta_y(PO_4)_3$ where y is from about 0.5 to about 0.5, $Li_{1-y}Hf_{2-y}Ta_y(PO_4)_3$ where y is from about 0 to about 0.5, and $Li_{1-2x}Mg_xZr_2(PO_4)_3$ where x is from about .05 to about 0.15. As stated previously, these are the preferred compositions.

The lithium phosphates useful in this invention can be prepared by conventional solid state reaction methods by direct combination of phosphates and sources of the metals such as oxides and carbonates in proportions dictated by the desired stoichiometry of the product. Typically, diammonium hydrogen phosphate is used as the phosphate source, carbonates are used as the source of lithium, and oxides are used as the source of the other metals. Any inert container can be used to contain the reactants during the heating cycle; platinum crucibles are particularly useful to avoid contamination. The reactants should be intimately mixed before heating. The heating cycle should be sufficiently long and the maximum temperatures chosen so as to promote the solid state reaction to essentially completion and to obtain the desired crystal structure.

A low temperature distorted form of $LiZr_2(PO_4)_3$ has been found which converts to the rhombohedral structure between 1200° and 1300° C. For these compositions, higher ionic conductivities are generally obtained with the undistorted phase and it is important to heat these compositions to 1200°–1300° C and follow with a rapid quench in air to insure complete conversion to the undistorted rhombohedral phase. Small amounts of tantalum or niobium substituted with zirconium stabilize the high temperature rhombohedral form, whereas small amounts of magnesium substituted for lithium stabilize the low temperature distorted form. Magnesium-substituted lithium zirconium phosphate retains the distorted-rhombohedral structure even when quenched from 1400° C, but still exhibits a high conductivity. The undistorted rhombohedral phase appears to require no stabilization in $LiHf_2(PO_4)_3$ and related compositions.

The heating cycle consists of gradually heating the samples to a temperature of between 1200° and 1400° C, preferably 1300° C or higher, over a period of from about 20 to about 40 hours and maintaining this maximum temperature for a period of from about 10 to about 30 hours. Interruption of the heating cycle and regrinding the samples at one or more intermediate stages facilitates the reaction. As indicated previously, a rapid air quench is necessary.

The identity of these lithium phosphate products can be determined from characteristic x-ray diffraction patterns by techniques as outlined in standard references such as B. D. Cullity, "Elements of X-ray Diffraction," Addison-Wesley, Reading, Mass. (1956). It is convenient to index the Hägg-Guinier powder patterns on the basis of a hexagonal unit cell as described in the aforesaid Sljukic et al. and Hagman and Kierkegaard references.

The conductivity of the lithium phosphates can be measured using both a-c and d-c methods. To carry out the conductivity measurements, a pellet or disc formed from one of the lithium phosphates is mounted in a stainless steel holder between two discs of Li foil 0.015 inches thick supported on Ni screens. The sample temperature is raised above the melting point of Li metal to assure good contact. The a-c conductance is measured using a Wayne-Kerr universal bridge at an angular frequency of $10^4$ sec$^{-1}$. The d-c conductivity is checked by applying slowly varying voltages (triangular wave forms with a frequency less than 0.01 Hz) and recording the current. Excellent agreement with a-c results are usually obtained.

For measuring conductivity, a disc about one-half inch in diameter and about 0.1–1 cm thick is prepared from a powder of the lithium phosphate composition. The disc is generally prepared either by sintering, i.e., the powder is pressed in a steel die at 5000–50,000 psi and heated to a temperature of 1300° C or more (up to about 1400° C) for up to 20 hours, or by hot pressing in a graphite die, i.e., the powder is heated to 1400°–1500° C while under 4000 psi for from 15–30 minutes.

The compositions described herein are useful as solid electrolytes which pass currents of $Li^+$. These compositions can be used in galvanic cells such as high-energy density storage batteries which most probably would operate at elevated temperatures with molten Li as the anode source of lithium ions and liquid sulfur, selenium, or tellurium as the cathode which serves to remove the lithium ions by forming a composition approaching, e.g., $Li_2S$, etc.

Figure 3:
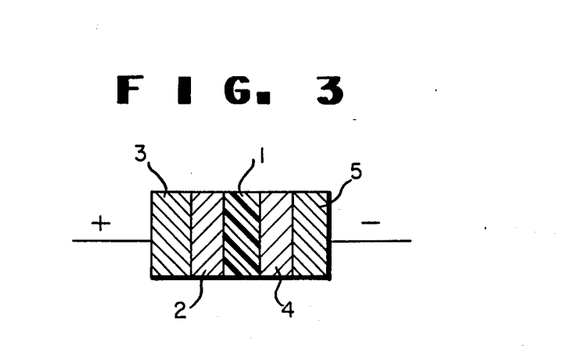
FIG. 3 is an illustrative, cross-sectional view of a primary cell using a lithium phosphate solid electrolyte.

These compositions can also be used in low drain, low power density primary batteries including completely solid state primary batteries. FIG. 3 shows a primary battery with a lithium hafnium phosphate electrolyte. The anode 2 for such batteries usually consists of Li metal, LiAl or LiHg amalgam. The cathode 4 may be $Cu_2S$, $Li_xV_2O_5$, $Li_xMoO_3$ or similar materials which react with and thereby remove the lithium transmitted through the solid electrolyte 1. Connector electrodes 3 and 5 make an electrical circuit between the Li metal anode and the $Li^+$-removing cathode. An all-solid cell would be encapsulated to prevent reaction of the components with the atmosphere. Completely solid state cells offer the advantages of long shelf life, broad temperature range of operability and miniaturization.

Another electrochemical device in which these compositions can be used is one for electrowinning or purifying lithium metal. For the electrowinning of lithium metal, the anode can consist of a carbon electrode situated in a dissociable molten salt such as $LiCl\cdot AlCl_3$ or $LiNO_3$. $Li^+$ ions are electrically transported from the molten salt through the solid electrolyte of one of the instant compositions and converted to elemental lithium at the cathode.

For the purification of lithium, the anode consists of an inert connecting electrode situated in a molten alloy, such as LiHg amalgam, or other source of impure lithium. Lithium ions are produced at the anode and are electrically attracted through a solid electrolyte of one of the instant compositions. The ions are then deposited at the cathode as pure elemental lithium.

Other devices in which these electrolytes can be used, e.g., coulometers, timers, etc. will be obvious to those skilled in the art.

EMBODIMENTS OF THE INVENTION

The following examples illustrate the preparation of lithium phosphate compositions and their use as solid electrolytes.

EXAMPLE 1

An intimate mixture of 0.301 g $Li_2CO_3$, 2.259 g $ZrO_2$, 0.450 g $Ta_2O_5$ and 4.035 g $(NH_4)_2HPO_4$ was placed in a platinum crucible and heated to 550° C for 15 hrs, 600° C for 2 hrs, 900° C for 15 hrs two times, 1200° C for 15 hrs two times, with intermediate grinding in an agate mortar between each heating. Finally a small portion of the resulting powder was pressed into ¼ inches pellets approximately 1 mm in thickness which were heated to 1230° C for 15 hours and rapidly quenched in air. The white product $Li_8Zr_{1.8}Ta_{.2}$—$(PO_4)_3$ gave a single phase x-ray pattern characteristic of the rhombohedral phase as shown in Table 1. Hexagonal unit cell dimensions obtained from an analysis of this data are $a = 8.8434 \pm .0005$ A, $c = 22.168 \pm 0.002$ A and $V = 1501.4 \pm .2$ A$^3$.

Figure 2:
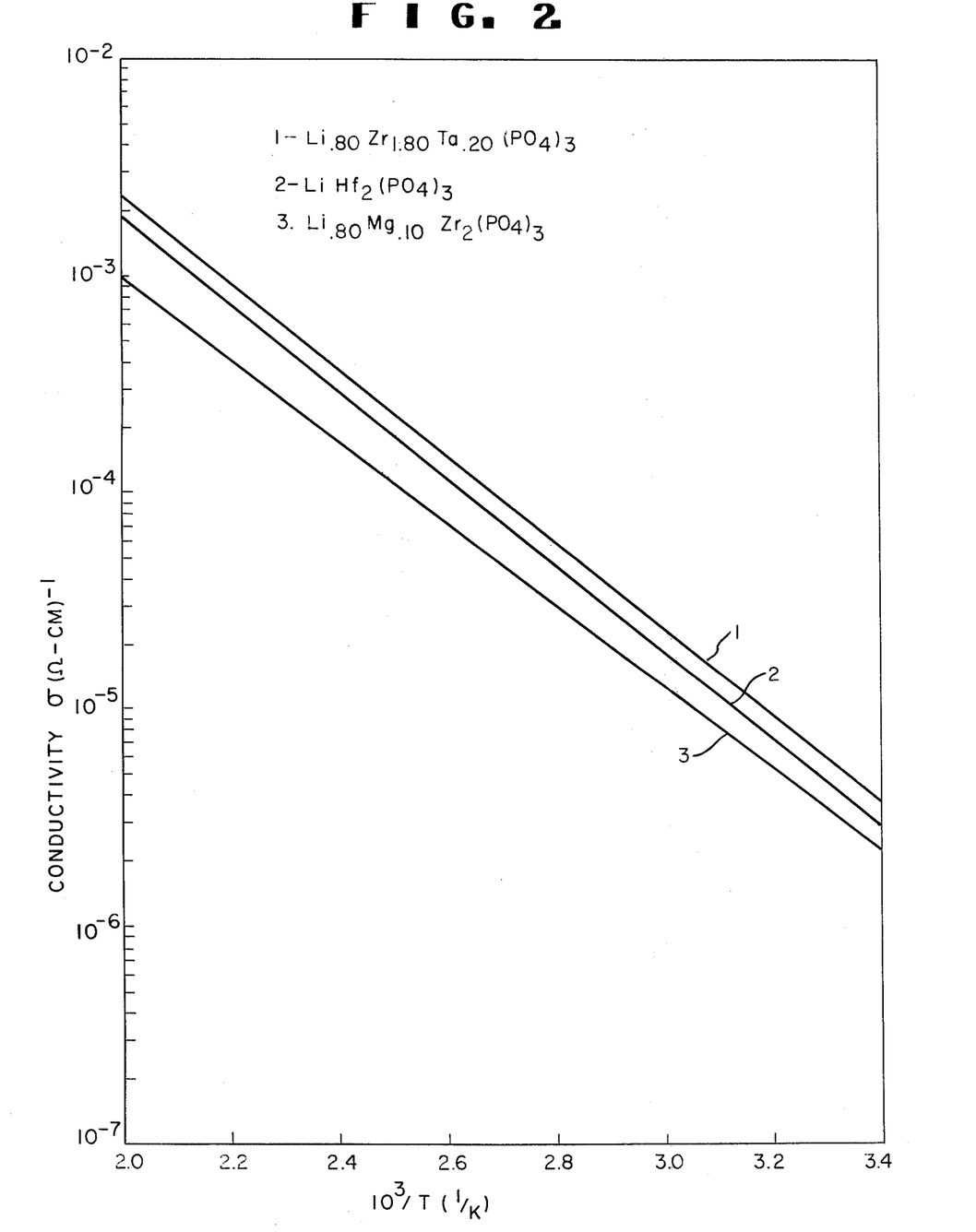
FIG. 2 is a graph showing the temperature dependence of the conductivity of three of the preferred lithium phosphates, $Li_{.8}Zr_{1.8}Ta_{.2}(PO_4)_3$, $LiHf_2(PO_4)$ and $LI_{.8}Mg_{.1}Zr_2(PO_4)_3$.

A portion of the finely ground product was placed in a graphite mold and hot-pressed at a pressure of 4000 psi and a temperature of 1400° C for 20 minutes. The resultant pellet was 85% dense when compared with the bulk density calculated from the above cell dimension, and suitable for measurement of ionic conductivity. The conductivity of this sample at 200° C is shown in FIG. 1 ($1.5 \times 10^{-3}$ ($\Omega$ cm$^{-1}$)) and the temperature dependence of the conductivity is shown in FIG. 2.

TABLE I

X-ray Diffraction Pattern of $Li_8Zr_{1.8}Ta_{.2}(PO_4)_3$

| h | k | l | I* | $d_{obs}$ | h | k | l | I* | $d_{obs}$ |
|---|---|---|----|-----------|---|---|---|----|-----------|
| 0 | 1 | 2 | 70 | 6.28070 | 0 | 4 | 5 |    |         |
| 1 | 0 | 4 | 100 | 4.48357 | 1 | 1 | 12 | 5 | 1.70455 |
| 1 | 1 | 0 | 90 | 4.41486 | 3 | 1 | 8 | 30 | 1.68564 |
| 1 | 1 | 3 | 80 | 3.79032 | 3 | 2 | 4 | 45 | 1.67454 |
| 0 | 2 | 1 |    |         | 4 | 1 | 0 | 55 | 1.67181 |
| 2 | 1 | 1 | 30 | 2.86911 | 2 | 2 | 9 | 2 | 1.64550 |
| 1 | 1 | 6 | 75 | 2.83388 | 2 | 3 | 5 | 2 | 1.63307 |
| 0 | 1 | 8 | 10 | 2.60537 | 4 | 1 | 3 |    |         |
| 2 | 1 | 4 | 70 | 2.56450 | 0 | 1 | 14 | 10 | 1.55031 |
| 3 | 0 | 0 | 60 | 2.55260 | 1 | 3 | 10 | 40 | 1.53366 |
| 2 | 0 | 8 | 25 | 2.24485 | 3 | 2 | 7 |    |         |
| 2 | 2 | 0 | 10 | 2.21196 | 4 | 1 | 6 | 20 | 1.52277 |
| 1 | 1 | 9 | 10 | 2.15162 | 2 | 3 | 8 | 10 | 1.48375 |
| 2 | 1 | 7 | 10 | 2.13492 | 0 | 5 | 4 | 20 | 1.47533 |
| 1 | 0 | 10 | 10 | 2.13045 | 3 | 3 | 0 |    |         |
| 2 | 2 | 3 | 5 | 2.11766 | 2 | 0 | 14 | 20 | 1.46286 |
| 1 | 3 | 1 |    |         | 3 | 1 | 11 |    |         |
| 3 | 0 | 6 | 10 | 2.10019 | 4 | 0 | 10 | 20 | 1.44883 |
| 3 | 1 | 2 | 5 | 2.08630 | 5 | 0 | 5 |    |         |
| 1 | 2 | 8 | 55 | 2.00140 | 2 | 2 | 12 | 10 | 1.41786 |
| 1 | 3 | 4 | 45 | 1.98343 | 2 | 4 | 4 | 20 | 1.40063 |
| 0 | 2 | 10 | 20 | 1.91858 | 1 | 1 | 15 |    |         |
| 3 | 1 | 5 |    |         | 1 | 2 | 14 | 20 | 1.38903 |
| 2 | 2 | 6 | 45 | 1.89683 | 0 | 4 | 11 |    |         |
| 0 | 4 | 2 | 10 | 1.88688 | 3 | 2 | 10 | 15 | 1.37676 |
| 0 | 0 | 12 | 2 | 1.84845 | 4 | 2 | 5 |    |         |
| 4 | 0 | 4 | 5 | 1.81001 | 0 | 5 | 7 |    |         |
| 2 | 1 | 10 | 50 | 1.76008 | 5 | 1 | 4 | 20 | 1.33515 |

*The most intense line is arbitrarily assigned an intensity of 100.

EXAMPLE 2

An intimate mixture of 0.0390 g $Li_2CO_3$, 2.598 g $ZrO_2$, and 4.176 g $(NH_4)_2HPO_4$ was heated in a platinum crucible in the same manner as Example 1. The resulting material $LiZr_2(PO_4)_3$ gave a single phase x-ray pattern characteristic of the rhombohedral phase, and similar to that shown in Table 1, with the lattice parameters $a = 8.8429 \pm 0.0005$ A, $c = 22.286 \pm 0.002$ A and $V = 1509.1 \pm .2$ A$^3$.

An equivalent composition prepared in a similar manner had a conductivity at 200° C of $1.9 \times 10^{-5}$ ($\Omega$ cm)$^{-1}$.

EXAMPLES 3 – 5

Compositions containing various amounts of Ta substituted for Zr were prepared by intimately mixing the amounts of $Li_2CO_3$, $ZrO_2$, $Ta_2O_5$, and $(NH_4)_2 HPO_4$ dictated by the stoichiometry of the desired composition and heating this mixture in a platinum crucible in the same manner as Example 1. Pellets of these products were hot-pressed. The pellets of Examples 3 – 4 were hot-pressed at a pressure of 4000 psi and a temperature of 1500° C for 15 minutes. The pellet of Example 5 was hot-pressed at a pressure of 4000 psi and a temperature of 1400° C for 20 minutes. The quantities of reactants used and the unit cell constants deduced from x-ray patterns similar to that of Example 1 are given in Table II. The conductivities of these pellets at 200° C are shown in FIG. 1.

TABLE II

| Example No. | Product | Reactants | | | | Hexagonal Unit Cell Parameters | | |
|---|---|---|---|---|---|---|---|---|
| | | $Li_2CO_3$ | $ZrO_2$ | $(NH_4)_2HPO_4$ | $Ta_2O_5$ | a(A) | c(A) | V(A³) |
| 3 | $Li_{.95}Zr_{1.95}Ta_{.05}(PO_4)_3$ | .367 g | 2.511 g | 4.140 g | .115 g | 8.8569±.0007 | 22.147±.003 | 1504.6±.3 |
| 4 | $Li_{.90}Zr_{1.90}Ta_{.10}(PO_4)_3$ | .345 | 2.426 | 4.105 | .229 | 8.8520±.0004 | 22.148±.002 | 1503.0±.1 |
| 5 | $Li_{.50}Zr_{1.50}Ta_{.50}(PO_4)_3$ | .179 | 1.792 | 3.841 | 1.071 | 8.812±.005 | 22.30±.02 | 1499±1 |

EXAMPLE 6

An intimate mixture of 0.392 g $Li_2CO_3$, 3.919 g $ZrO_2$, 1.409 g $Nb_2O_5$ and 8.399 g $(NH_4)_2HPO_4$ was heated in a platinum crucible for 5 hours at 400° C, 9 hours at 900° C, 2 hours at 1200° C, ground in an agate mortar, and reheated for 15 hours at 1300° C and then quenched in air. The resulting product $Li_{.5}Zr_{1.5}Nb_{.5}(PO_4)_3$ gave an x-ray pattern of the rhombohedral phase similar to that shown in Table 1 with the hexagonal unit cell dimensions of $a = 8.8069 \pm .0007$ A, $c = 22.289 \pm .003$ A, and $V = 1497.2 \pm .2$ A³.

A small hand press was used to press pellets of the desired compositions one-fourth inch diameter and 1 to 2 mm thick. These pellets were then heated to a sufficiently high temperature to give well-sintered discs. Sputtered gold electrodes were attached to these pellets and contact to the measuring circuit was made by attaching wires with silver paste contacted to the gold. A Hewlett-Packard Model No. 42FOA Automatic Capacitance bridge was used to measure capacitance and a-c conductance at frequencies of $10^3$, $10^4$, $10^5$, and $10^6$ Hertz as a function of temperature from room temperature to 300° C. The conductivity at 300° C was $6.22 \times 10^{-4}$ $(\Omega \text{ cm})^{-1}$.

EXAMPLE 7

An intimate mixture of 0.622 g $Li_2CO_3$, .085 g MgO, 5.185 g $ZrO_2$ and 8.335 g $(NH_4)_2HPO_4$ was heated in a platinum crucible to 350° C for 15 hours, 550° C for 15 hours, 840° C for 8 hours, 1200° C for 15 hours twice, 1300° C for 3 hours and 1400° C for 4 hours, with intermediate grindings between each heat treatment. The resulting product $Li_{.8}Mg_{.1}Zr_2(PO_4)_3$, quenched from 1400° C in air was white and gave an x-ray pattern shown in Table III characteristic of the single phase distorted rhombohedral material. A portion of the finely ground product was placed in a graphite mold and hot-pressed at a pressure of 4000 psi and a temperature of 1500° C for 15 minutes. The resultant pellet was 91% dense and suitable for measurement of ionic conductivity. The temperature dependence of the conductivity of the sample is shown in FIG. 2.

TABLE III

| N | $d_{obs}$ | I | | 1/dSQ | 2 THETA |
|---|---|---|---|---|---|
| 1 | 6.3633 | 30 | DB | 0.02470 | 13.905 |
| 2 | 6.3293 | 35 | DB | 0.02496 | 13.980 |
| 3 | 6.2813 | 30 | DB | 0.02535 | 14.087 |
| 4 | 4.5507 | 100 | DB | 0.04829 | 19.490 |
| 5 | 4.4839 | 50 | DB | 0.04974 | 19.783 |
| 6 | 4.4703 | 75 | DB | 0.05004 | 19.844 |
| 7 | 4.4261 | 60 | DB | 0.05105 | 20.044 |
| 8 | 4.4059 | 75 | DB | 0.05152 | 20.137 |
| 9 | 4.3866 | 5 | DB | 0.05197 | 20.226 |
| 10 | 4.3577 | 20 | DB | 0.05266 | 20.362 |
| 11 | 3.8184 | 5 | ? | 0.06859 | 23.276 |
| 12 | 3.7914 | 80 | DB | 0.06957 | 23.444 |
| 13 | 3.7789 | 90 | DB | 0.07003 | 23.522 |
| 14 | 3.1838 | 40 | | 0.09865 | 28.001 |
| 15 | 3.1352 | 10 | ? | 0.10174 | 28.444 |
| 16 | 2.8752 | 40 | BR | 0.12097 | 31.078 |
| 17 | 2.8541 | 10 | BR | 0.12276 | 31.314 |
| 18 | 2.8339 | 10 | DB | 0.12452 | 31.543 |
| 19 | 2.8221 | 40 | DB | 0.12557 | 31.679 |
| 20 | 2.5545 | 50 | | 0.15324 | 35.099 |
| 21 | 2.5422 | 30 | | 0.15473 | 35.274 |
| 22 | 2.5117 | 5 | | 0.15851 | 35.717 |
| 23 | 2.2736 | 5 | | 0.19345 | 39.605 |
| 24 | 2.1776 | 2 | | 0.21089 | 41.431 |
| 25 | 2.1105 | 2 | | 0.22450 | 42.810 |
| 26 | 2.0307 | 2 | | 0.24250 | 44.582 |
| 27 | 2.0022 | 5 | | 0.24944 | 45.250 |
| 28 | 1.9914 | 5 | | 0.25217 | 45.510 |
| 29 | 1.9865 | 2 | | 0.25341 | 45.628 |
| 30 | 1.9749 | 10 | BR | 0.25638 | 45.911 |
| 31 | 1.9389 | 2 | BR | 0.26600 | 46.814 |
| 32 | 1.9080 | 2 | BR | 0.27468 | 47.618 |
| 33 | 1.8899 | 25 | BR | 0.27998 | 48.104 |
| 34 | 1.8810 | 2 | BR | 0.28264 | 48.347 |
| 35 | 1.7861 | 15 | BR | 0.31347 | 51.094 |
| 36 | 1.7590 | 2 | | 0.32321 | 51.940 |
| 37 | 1.7518 | 10 | BR | 0.32586 | 52.169 |
| 38 | 1.6765 | 10 | BR | 0.35578 | 54.701 |
| 39 | 1.6662 | 25 | BR | 0.36020 | 55.069 |
| 40 | 1.6561 | 10 | BR | 0.36461 | 55.433 |
| 41 | 1.5741 | 2 | ? | 0.40360 | 58.594 |
| 42 | 1.5335 | 5 | Br | 0.42526 | 60.305 |
| 43 | 1.5272 | 5 | BR | 0.42878 | 60.580 |
| 44 | 1.5170 | 5 | BR | 0.43451 | 61.026 |
| 45 | 1.4774 | 5 | BR | 0.45815 | 62.847 |
| 46 | 1.4712 | 5 | BR | 0.46203 | 63.143 |
| 47 | 1.4561 | 5 | BR | 0.47162 | 63.872 |
| 48 | 1.3947 | 2 | | 0.51409 | 67.046 |
| 49 | 1.3370 | 5 | BR | 0.55943 | 70.355 |
| 50 | 1.2231 | 2 | ? | 0.66848 | 78.066 |
| 51 | 1.1716 | 2 | ? | 0.72857 | 82.213 |

BR — Broad
DB — Doublet

EXAMPLE 8

An intimate mixture of 0.569 g $Li_2CO_3$, 6.488 g $HfO_2$ and 6.106 g $(NH_4)_2HPO_4$ was heated in a platinum crucible to 300° C for 15 hours, 900° C for 4 hours, 1200° C for 15 hours, 1300° C for 6 hours, and finally air quenched. Intermediate grindings between each heat treatment were carried out in an agate mortar. The resulting product $LiHf_2(PO_4)_3$ gave a single phase x-ray pattern of rhombohedral symmetry similar to that shown in Table 1 for Example 1 with the hexagonal unit cell parameters $a = 8.8117 \pm 0.0007$ A, $c = 21.973 \pm 0.003$ A, and $V = 1477.5 \pm .3$ A³. A portion of the ground product was placed in a graphite mold and hot-pressed at a pressure of 4000 psi and a temperature of 1500° C for 15 minutes. The resultant pellet was 89% dense and suitable for measurement of ionic conductivity. The temperature dependence of the conductivity of the sample is shown in FIG. 2.

EXAMPLE 9

An intimate mixture of 0.456 g $Li_2CO_3$, 5.847 g $HfO_2$, 0.682 g $Ta_2O_5$, and 6.144 g $(NH_4)_2HPO_4$ was heated in a platinum crucible for 6 hours at 400° C, for 1 hour at 450° C, for 15 hours at 910° C, for 15 hours at 1300° C, and finally air quenched, with intermediate grinding between heat treatments. The resulting product $Li_{.8}Hf_{1.8}Ta_{.2}(PO_4)_3$ gave an x-ray pattern characteristic of the rhombohedral symmetry similar to that shown in Table I for Example 1 with the hexagonal lattice parameters $a = 8.8018 \pm .0007$ A, $c = 22.046 \pm .003$ A, and $V = 1479.1 \pm .2$ A$^3$. This product had a conductivity at 200° C of $6.7 \times 10^{-4}$ ($\Omega$ cm)$^{-1}$.

EXAMPLE 10

An intimate mixture of 0.286 g Li$_2$CO$_3$, 4.883 g HfO$_2$, 1.709 g Ta$_2$O$_5$ and 6.127 g (NH$_4$)$_2$HPO$_4$ was heated in a platinum crucible for 6 hours at 400° C, for 1 hour at 450° C, for 15 hours at 910° C, for 15 hours at 1300° C, and finally for 4 hours at 1400° C, followed by a rapid air quench, with intermediate grinding between heat treatments. The resulting product Li$_{.5}$Hf$_{1.5}$Ta$_{.5}$(PO$_4$)$_3$ gave an x-ray pattern characteristic of the rhombohedral structure similar to that shown in Table I for Example 1, with the hexagonal lattice parameters $a = 8.7721 \pm .0006$ A, $c = 22.215 \pm .002$ A, and $V = 1480.4 \pm .2$ A$^3$.

A portion of the ground product was pressed in a stainless steel die at 5000 psi. The disc thus formed was then hot pressed into a ceramic by pressing at 4000 psi and 1500° C for 15 minutes in a graphite mold. The resulting ceramic was then heated to 900° C for 24 hours in air to get rid of graphite surface contamination. The ceramic had a density of 84%. The conductivity was measured using lithium electrodes and had a value of $9.8 \times 10^{-4}$ $\Omega^{-1}$ cm$^{-1}$ at 200° C.

EXAMPLE 11

An intimate mixture of 0.037 g Li$_2$CO$_3$, 5.240 g HfO$_2$, 1.103 g Nb$_2$O$_5$ and 6.575 g (NH$_4$)$_2$HPO$_4$ was heated in a platinum crucible for 15 hours at 250° C, for 15 hours at 480° C, and for 6 hours at 900° C. The sample was then ballmilled dry in an agate mill for 30 minutes, and reheated to 1300° C for 10 hours, followed by a rapid quench in air. The resulting yellowish product Li$_{.5}$Hf$_{1.5}$Nb$_{.5}$(PO$_4$)$_3$ gave an x-ray pattern characteristic of the rhombohedral structure similar to that shown in Table I for Example 1 with hexagonal unit cell parameters $a = 8.7770 \pm 0.0004$ A, $c = 22.1745 \pm .0002$ A, and $V = 1479.4 \pm 0.1$ A$^3$. The conductivity of this product at 300° C measured as in Example 6 was $6.92 \times 10^{-4}$ ($\Omega$ cm)$^{-1}$.

EXAMPLE 12

An intimate mixture of 0.455 g Li$_2$CO$_3$, 0.062 g MgO, 6.478 g HfO$_2$ and 6.096 g (NH$_4$)$_2$HPO$_4$ was heated in a platinum crucible for 15 hours at 200° C, for 4 hours at 500° C, for 2 hours at 900° C, quenched in air and then ballmilled for 30 minutes. The resulting fine yellow powder was heated for 15 hours at 1300° C, reground, and reheated for 15 hours at 1350° C, followed by a rapid quench in air. The resulting product Li$_{.8}$Mg$_{.1}$Hf$_2$(PO$_4$)$_3$ gave an x-ray pattern characteristic of the rhombohedral symmetry and similar to that shown in Table I for Example 1 with hexagonal unit cell parameters $a = 8.8143 \pm .0006$ A, $c = 21.967 \pm 0.002$ A, and $V = 1478.0 \pm 0.2$ A$^3$. Some weak impurity lines were observed in the Guinier x-ray pattern.

EXAMPLE 13

An intimate mixture of 0.455 g Li$_2$CO$_3$, 0.047 g MgO, 6.321 g HfO$_2$, 0.170 g Ta$_2$O$_5$ and 6.101 g (NH$_4$)$_2$HPO$_4$ was heated in a platinum crucible for 15 hours at 200° C, for 2 hours at 400° C, for 15 hours at 900° C, quenched in air and ground in an agate mortar. The resulting fine powder was reheated for 15 hours at 1300° C, for 5 hours at 1350° C and rapidly quenched in air. The resulting product Li$_{.8}$Mg$_{.075}$Hf$_{1.95}$Ta$_{.05}$(PO$_4$)$_3$ gave an x-ray pattern characteristic of the rhombohedral symmetry and similar to that shown in Table I for Example 1 with hexagonal unit cell parameters $a = 8.8083 \pm .0005$ A, $c = 21.977 \pm .002$ A, and $V = 1476.7 \pm .2$ A$^3$. The conductivity of this product at 300° C measured as in Example 6 was $1.17 \times 10^{-4}$ ($\Omega$ cm)$^{-1}$.

EXAMPLE 14

An intimate mixture of 0.632 g Li$_2$CO$_3$, 3.278 g ZrO$_2$, 2.000 g HfO$_2$, 0.420 g Ta$_2$O$_5$ and 7.529 g (NH$_4$)$_2$HPO$_4$ was heated for 15 hours at 400° C, for 15 hours at 900° C, ballmilled, reheated for 15 hours at 1300° C, and quenched in air. The resulting product Li$_{.9}$Zr$_{1.4}$Hf$_{.5}$Ta$_{.1}$(PO$_4$)$_3$ gave single phase x-ray pattern characteristic of the rhombohedral symmetry and similar to that shown in Table I for Example 1 with hexagonal unit cell parameters $a = 8.8401 \pm 0.004$ A, $c = 22.116 \pm 0.002$ A, and $V = 1496.8 \pm 0.1$ A$^3$. The conductivity of this product at 300° C measured as in Example 6 was $1.7 \times 10^{-5}$ ($\Omega$ cm)$^{-1}$.

EXAMPLE 15

An intimate mixture of 0.420 g Li$_2$CO$_3$, 2.421 g ZrO$_2$, 0.229 g Ta$_2$O$_5$, 3.825 g (NH$_4$)$_2$HPO$_4$ and 0.124 g SiO$_2$ was heated in a platinum crucible for 15 hours at 200° C, for 15 hours at 450° C, for 15 hours at 900° C, ballmilled and reheated for 15 hours at 1300° C and then quenched in air. The resulting product Li$_{1.1}$Zr$_{1.9}$Ta$_{.1}$(P$_{.933}$Si$_{.067}$O$_4$)$_3$ gave a single phase x-ray pattern characteristic of rhombohedral symmetry and similar to that shown in Table I for Example I with hexagonal unit cell parameters $a = 8.8707 \pm .0006$ A, $c = 22.056 \pm .003$ A, and $V = 1503.1 \pm .2$ A$^3$.

EXAMPLE 16

An intimate mixture of 0.312 g Li$_2$CO$_3$, 3.039 g (NH$_4$)$_2$HPO$_4$ and 3.229 g HfO$_2$ was heated in a platinum crucible for 15 hours at 400° C, for 4 hours at 900° C, ground in an agate mortar, and reheated twice at 1300° C for 15 hours followed by an air quench. The resulting produce LiHf$_2$(PO$_4$)$_3$·(0.1)Li$_2$O gave a single phase x-ray pattern characteristic of rhombohedral symmetry and similar to that shown in Table I for Example 1 with hexagonal unit cell parameters $a = 8.8254 \pm 0.0003$ A, $c = 22.010 \pm 0.001$ A, and $V = 1484.6 \pm 0.1$ A$^3$. An equivalent composition prepared in a similar manner had a conductivity at 200° c of $1.3 \times 10^{-3}$ ($\Omega$ cm)$^{-1}$.

EXAMPLE 17

An intimate mixture of 0.426 g Li$_2$CO$_3$, 2.582 g ZrO$_2$ and 4.150 g (NH$_4$)$_2$HPO$_4$ was treated under identical conditions as those used in Example 16. The resulting product LiZr$_2$(PO$_4$)$_3$·(.1)Li$_2$O gave a single phase x-ray pattern characteristic of the distorted-rhombohedral lattice. An equivalent composition prepared in a similar manner had a conductivity at 200° C of $6.6 \times 10^{-5}$ ($\Omega$ cm)$^{-1}$.

EXAMPLE 18

A primary cell containing lithium metal as anode, lithium hafnium phosphate (LiHf$_2$(PO$_4$)$_3$) as electrolyte, and Li$_{.33}$V$_2$O$_5$ as cathode was assembled as shown in FIG. 3. The lithium hafnium phosphate used in this cell was prepared in a manner similar to that used in Example 8. A pellet of the single phase rhombohedral material was pressed at 50,000 psi and heated to 1400° C for 15 hours, for 4 hours at 1500° C, and rapidly quenched in air and served as the electrolyte 1. The electrolyte pellet was one-half inch in diameter and approximately 0.5 cm thick.

A thin (0.3 cm) pellet of $Li_{.33}V_2O_5$ was made by pressing the finely ground powder at 50,000 psi. This pellet was placed underneath the sintered pellet of lithium hafnium phosphate and placed in a furnace at 600° C. After several minutes the two pellets were satisfactorily bonded together and were quenched in air. The lithium vanadate serves as the cathode 2.

The cathode-electrolyte composite, was placed in a sample holder between Ni-felt 3 on the cathode side, and lithium foil 4 (0.04 cm thick) and Ni-felt 5 (which serves to contain the molten lithium) on the anode side. The nickel felt discs serve as connector electrodes for the anode and cathode. The aforementioned cell components were pressed together by spring loaded steel rods. The open circuit voltage measured at 167° C was 3.57 volts. The following current-voltage relationships were obtained at 167° C.

| Cell Current | Cell Voltage | |
|---|---|---|
| 0 | 3.57 volts | (O.C.V.) |
| .01 ma | 3.00 volts | |
| .02 ma | 2.50 volts | |
| .03 ma | 2.00 volts | |

The power density output of the cell at 2 volts is ~.05 ma/cm². This output could be improved by using a thinner layer of electrolyte.

What is claimed is:

1. A lithium phosphate of the formula:

$$Li_{1-2x-y+z}Mg_xM_{2-y}^{4+}M_y^{5+}(P_{1-2z/3}Si_{2z/3}O_4)_3 \cdot q(Li_2O)$$

wherein
$M^{4+}$ is at least one of zirconium and hafnium;
$M^{5+}$ is at least one of niobium and tantalum;
$x$ is 0 to about 0.15;
$y$ is 0 to about 0.5;
$z$ is 0 to about 0.3;
$q$ is 0 to about 0.2; and
$2x+y-z$ is at least $-0.1$ and at least one of $x, y$ and $z$ is not equal to 0.

2. The lithium phosphate of claim 1 wherein $2x+y-z$ is at least $-0.1$ and no greater than about 0.5.

3. The lithium phosphate of claim 1

$$Li_{1-2x-y}Mg_xM_{2-y}^{4+}M_y^{5+}(PO_4)_3$$

wherein
$x$ is 0 to about 0.15;
$y$ is 0 to about 0.5; and
$2x+y$ is greater than 0.05 and no greater than about 0.5.

4. The lithium phosphate of claim 1

$$Li_{1-y}M_{2-y}^{4+}M_y^{5+}(PO_4)_3$$

wherein $y$ is about 0.05–0.5.

5. The lithium phosphate of claim 4 wherein $M^{5+}$ is tantalum.

6. The lithium phosphate of claim 5 wherein $M^{4+}$ is zirconium.

7. The lithium phosphate of claim 5 wherein $M^{4+}$ is hafnium.

8. The lithium phosphate of claim 1

$$Li_{1-2x}Mg_xM_2^{4+}(PO_4)_3$$

wherein
$x$ is about 0.05–0.15.

9. The lithium phosphate of claim 8 wherein $M^{4+}$ is zirconium.

10. In an electrochemical device having:
a. two electrodes, one of which is lithium, LiAl or LiHg amalgam;
b. a solid electrolyte separating the two electrodes; and
c. connecting electrical conductor to complete an electrical circuit between the two electrodes;

the improvement wherein the solid electrolyte consists essentially of a lithium phosphate of the formula:

$$Li_{1-2x-y+z}Mg_xM_{2-y}^{4+}M_y^{5+}(P_{1-2z/3}Si_{2z/3}O_4)_3 \cdot q(Li_2O)$$

wherein
$M^{4+}$ is at least one of zirconium and hafnium;
$M^{5+}$ is at least one of niobium and tantalum;
$x$ is 0 to about 0.15;
$y$ is 0 to about 0.5;
$z$ is 0 to about 0.3;
$q$ is 0 to about 0.2; and
$2x+y-z$ is at least $-0.1$.

11. The device of claim 10 wherein it is an electrolytic cell.

12. The device of claim 10 wherein it is a galvanic cell.

13. The device of claim 11 wherein the solid electrolyte consists essentially of the lithium phosphate of claim 8 or $Li_{1-y}M_{2-y}^{4+}M_y^{5+}(PO_4)_3$ wherein $y$ is 0 to about 0.5.

14. The device of claim 12 wherein the solid electrolyte consists essentially of the lithium phosphate of claim 8 or $Li_{1-y}M_{2-y}^{4+}M_y^{5+}(PO_4)_3$ wherein $y$ is 0 to about 0.5.

15. The device of claim 12 wherein the solid electrolyte consists essentially of $Li_{1-y}Zr_{2-y}Ta_y(PO_4)_3$ where $y$ is from about 0.05–0.5; $Li_{1-y}Hf_{2-y}Ta_y(PO_4)_3$ where $y$ is 0 to about 0.5 and $Li_{1-2x}Mg_xZr_2(PO_4)_3$ where $x$ is about 0.05–0.15.

16. The device of claim 11 wherein the solid electrolyte consists essentially of $Li_{1-y}Zr_{2-y}Ta_y(PO_4)_3$ where $y$ is from about 0.05–0.5; $Li_{1-y}Hf_{2-y}Ta_y(PO_4)_3$ where $y$ is 0 to about 0.5 and $Li_{1-2x}Mg_xZr_2(PO_4)_3$ where $x$ is about 0.05–0.15.

* * * * *

UNITED STATES PATENT OFFICE
CERTIFICATE OF CORRECTION

PATENT NO. : 4,009,092   Page 1 of 2
DATED : February 22, 1977
INVENTOR(S) : Barry Edward Taylor It is certified that error appears in the above-identified patent and that said Letters Patent are hereby corrected as shown below:

In column 2, line 32, the symbol "9" should read --q--.

In column 2, line 50, in the formula, "LI$_{.8}$" should read --Li$_{.8}$--.

In column 3, line 1, the symbol "9" should read --q--.

In column 3, line 38, the hyphen should be deleted.

In column 3, lines 58-59, the following is repetitious and contains an error and should be deleted:

"Li$_{1-y}$Hf$_{2-y}$Ta$_y$(PO$_4$)$_3$ where y is from about 0.5 to about 0.5,".

In column 5, line 64, the hyphen should be deleted.

In column 6, line 40, "0.0390" should read --0.390--.

In column 9, line 29, "0.037" should read --0.307--.

In column 10, line 41, the word "produce" should read --product--.

In column 11, line 35, the formula
"Li$_{1-2x-4+z}$Mg$_x$M$_{2-y}^{4+}$My$^{5+}$(P$_{1-2/3}$Si$_{z/3}$O$_4$)$_3 \cdot$q(Li$_2$O)"

UNITED STATES PATENT OFFICE
CERTIFICATE OF CORRECTION

PATENT NO. : 4,009,092   Page 2 of 2
DATED : February 22, 1977
INVENTOR(S) : Barry Edward Taylor It is certified that error appears in the above-identified patent and that said Letters Patent are hereby corrected as shown below:

should read:

$$--Li_{1-2x-y+z}Mg_xM_{2-y}{}^{4+}M_y{}^{5+}(P_{1-z/3}Si_{z/3}O_4)_3 \cdot q(Li_2O)--.$$

In column 12, line 5, the word "zirconcium" should read --zirconium--.

Signed and Sealed this

Eleventh Day of October 1977

[SEAL]

Attest:

RUTH C. MASON
*Attesting Officer*

LUTRELLE F. PARKER
*Acting Commissioner of Patents and Trademarks*